US006753691B2

(12) United States Patent
Lasalandra et al.

(10) Patent No.: US 6,753,691 B2
(45) Date of Patent: Jun. 22, 2004

(54) METHOD AND CIRCUIT FOR DETECTING DISPLACEMENTS USING MICRO-ELECTROMECHANICAL SENSORS WITH COMPENSATION OF PARASITIC CAPACITANCES AND SPURIOUS DISPLACEMENTS

(75) Inventors: Ernesto Lasalandra, S. Donato Milanese (IT); Tommaso Ungaretti, Pavia (IT); Andrea Baschirotto, Tortona (IT)

(73) Assignees: STMicroelectronics S.r.l., Agrate Brianza (IT); Hewlett-Packard Company, Boise, ID (US)

( * ) Notice: Subject to any disclaimer, the term of this patent is extended or adjusted under 35 U.S.C. 154(b) by 124 days.

(21) Appl. No.: 10/198,721

(22) Filed: Jul. 16, 2002

(65) Prior Publication Data

US 2003/0052699 A1 Mar. 20, 2003

(30) Foreign Application Priority Data

Jul. 17, 2001 (IT) .................................... TO2001A0699

(51) Int. Cl.$^7$ .............................................. G01R 27/26
(52) U.S. Cl. ....................................... 324/686; 324/661
(58) Field of Search ................................ 324/686, 658, 324/649, 600, 515, 559, 609, 662, 684, 259, 458, 123 C, 76.79, 76.81, 661; 361/26, 36, 37; 73/1.23, 35.16, 65.06, 65.09, 462, 649, 763, 774, 862.22, 862.325, 862.337, 862.473, 862.52, 862.625, 862.626, 861.24, 170.08, 170.09, 314, 514.32

(56) References Cited

U.S. PATENT DOCUMENTS

| 3,585,634 A | * | 6/1971 | Sharples ...................... 341/172 |
| 4,389,646 A | * | 6/1983 | Tago ....................... 340/870.37 |
| 5,095,762 A | * | 3/1992 | Holm-Kennedy et al. ..................... 73/862.041 |
| 5,708,376 A | * | 1/1998 | Ikeda ........................... 327/50 |
| 5,751,154 A | * | 5/1998 | Tsugai ......................... 324/661 |
| 6,192,757 B1 | * | 2/2001 | Tsang et al. ............... 73/514.32 |
| 6,296,779 B1 | * | 10/2001 | Clark et al. .................... 216/66 |
| 6,316,948 B1 | * | 11/2001 | Briefer ......................... 324/678 |
| 6,386,032 B1 | * | 5/2002 | Lemkin et al. ........... 73/504.02 |

OTHER PUBLICATIONS

U.S. patent application Ser. No. 10/081,134, Lasalandra et al., filed Feb. 20, 2002.

* cited by examiner

Primary Examiner—Andrew H. Hirshfeld
Assistant Examiner—Hoai-An D Nguyen
(74) Attorney, Agent, or Firm—Lisa K. Jorgenson; Harold H. Bennett, II; Seed IP Law Group PLLC (57) ABSTRACT

A method for detecting displacements of a micro-electromechanical sensor including a fixed body and a mobile mass, and forming a first sensing capacitor and a second sensing capacitor having a common capacitance at rest. The first and second sensing capacitors being connected to a first input terminal and, respectively, to a first output terminal and to a second output terminal of the sensing circuit. The method includes the steps of closing a first negative-feedback loop, which is formed by the first and second sensing capacitors and by a differential amplifier, feeding an input of the differential amplifier with a staircase sensing voltage through driving capacitors so as to produce variations of an electrical driving quantity which are inversely proportional to the common sensing capacitance, and driving the sensor with the electrical driving quantity.

22 Claims, 6 Drawing Sheets

METHOD AND CIRCUIT FOR DETECTING DISPLACEMENTS USING MICRO-ELECTROMECHANICAL SENSORS WITH COMPENSATION OF PARASITIC CAPACITANCES AND SPURIOUS DISPLACEMENTS

BACKGROUND OF THE INVENTION

1. Field of the Invention

The present invention relates to a method and a circuit for detecting displacements using micro-electromechanical sensors with compensation of parasitic capacitances and spurious displacements.

2. Description of the Related Art

As is known, the use of micro-electric-mechanical sensors, or MEMS sensors, with differential capacitive unbalance has been proposed for forming, for example, linear or rotational accelerometers and pressure sensors.

In particular, MEMS sensors of the indicated type comprise a fixed body (stator) and a moving mass, generally of suitably doped semiconductor material, connected to each other through elastic elements (springs) and restrained so that, with respect to the stator, the moving mass has predetermined translational and rotational degrees of freedom. Moreover, the stator and the moving mass have a plurality of fixed and, respectively, moving arms, interleaved to each other. In practice, each fixed arm is arranged between a pair of moving arms, so as to form a pair of capacitors having a common terminal and a capacitance which is a function of the relative position of the arms, that is of the relative position of the moving mass with respect to the stator. When the sensor is stressed, the moving mass moves and the capacitance of the capacitors is unbalanced.

Depending on the type of structure and relative movement allowed between the moving mass and the stator, it is possible to manufacture MEMS sensors of a linear or rotational type, with variable interspace (distance between each moving arm and the respective fixed arms) and/or with variable facing area (variation of the reciprocal facing area between the moving arms and the respective fixed arms).

In all mentioned cases, reading by the sensor (that is detection of an electric quantity representing the variation of the capacitance of the capacitors) leads to problems due to the presence of parasitic capacitors (pad and substrate capacitances). The reading precision is also limited by another drawback, which is caused by spurious displacements, i.e., displacements not according with the designed degrees of freedom and due to non-ideality of mechanical constraints.

For the sake of clarity, reference will be made to FIGS. 1 and 2, where a linear MEMS sensor 1 is shown; however, what will be explained hereinafter applies to MEMS sensors of any type.

In detail, the sensor 1 comprises a stator 2 and a moving mass 3, connected to each other by springs 4 so that the moving mass 3 can translate parallel to a first reference axis X, while it is substantially fixed with respect to a second and a third reference axes Y, Z. The sensor 1 is also symmetrical with respect to a longitudinal axis parallel to the first reference axis X.

The stator 2 and the moving mass 3 are provided with a plurality of first and second fixed arms 5', 5" and, respectively, with a plurality of moving arms 6, extending substantially parallel to the plane Y-Z.

Figure 2:
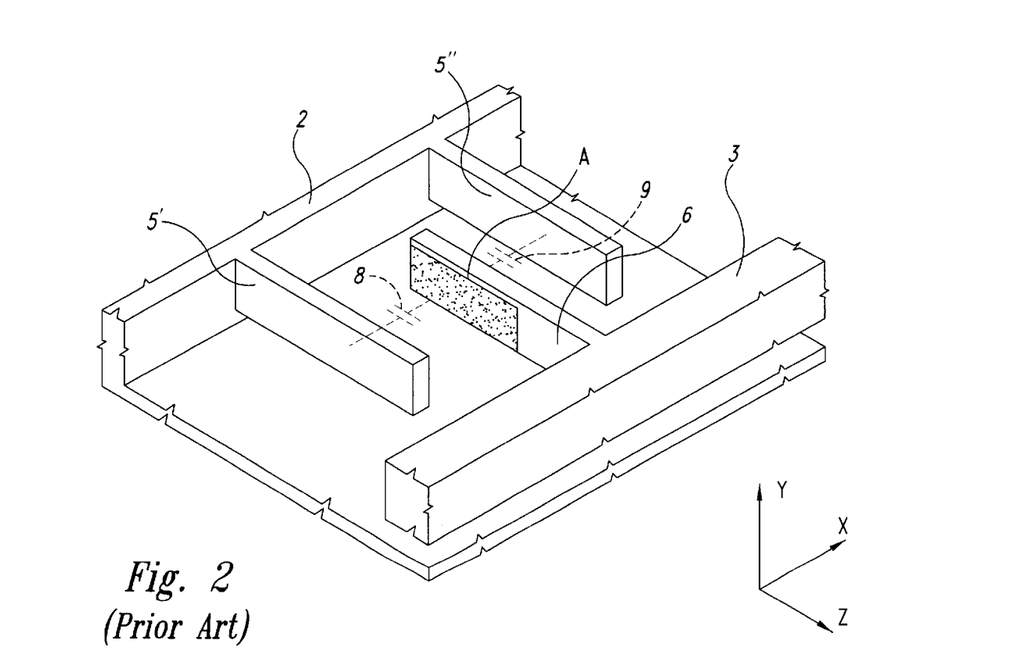
FIG. 2 is a perspective view of an enlarged detail of the sensor of FIG. 1.

As shown in detail in FIG. 2, each moving arm 6 is arranged between two respective fixed arms 5', 5", partially facing them. Consequently, the moving arm 6 forms, with the two fixed arms 5', 5", a first and, respectively, a second sensing capacitor 8, 9 with parallel flat faces. In particular, the area of the plates of the sensing capacitors 8, 9 is equal to the facing area A of the moving arms 6 and of the fixed arms 5', 5". In particular, the facing area A is substantially a rectangle with sides Ly, Lz.

The first and the second sensing capacitor 8, 9 have a first and a second sensing capacitance Ca, Cb, respectively, given by the equations:

$$Ca = \varepsilon \frac{A}{X1} \quad (1)$$

$$Cb = \varepsilon \frac{A}{X2} \quad (2)$$

where X1, X2 are the distances between the moving arm 6 and the first and, respectively, the second fixed arms 5', 5" of FIG. 2 and $\varepsilon$ is the dielectric constant of the air.

In the sensor 1, all the sensing capacitances Ca formed between the moving arms 6 and the first fixed arms 5' are parallel-connected; similarly all the sensing capacitances Cb formed between the moving arms 6 and the second fixed arms 5" are parallel-connected. Consequently, altogether two capacitances are present between the stator 3 and the moving mass 4, equal to C1=N*Ca and, respectively, to C2=N*Cb, with N number of moving arms 6 of the sensor 1. If we define as a common sensing capacitance Cs of the sensor 1 the value of the capacitances C1, C2 at rest, we have:

$$Cs=C1=C2 \quad (3)$$

After a movement of the moving arm 4 purely along the axis X, the sensing capacitances C1, C2 present variations with an opposite sign and with a same absolute value, and equal to a capacitive unbalance $\Delta Cs$.

In greater detail, supposing for simplicity's sake that the distances X1, X2 are initially the same and equal to a rest distance X0, from equations (1)–(3) it results that the component $\Delta Csx$ of the capacitive unbalance $\Delta Cs$ according to the first reference axis X is given by the equation:

$$\Delta CSx = -\frac{dCs}{dX}\Delta X = \frac{\varepsilon A}{X0^2}\Delta X = \frac{Cs}{X0}\Delta X \quad (4)$$

$$\Delta CSx = -\frac{dCs}{dX}\Delta X = \frac{\varepsilon A}{X0^2}\Delta X = \frac{Cs}{X0}\Delta X$$

where $\Delta X$ is the movement of the moving mass 4 long the first reference axis X.

In presence of a spurious movement $\Delta Y$ parallel to the second reference axis Y, the capacitive unbalance $\Delta Cs$ has a component $\Delta Csy$ given by the equation:

$$\Delta CSy = -\frac{dCs}{dY}\Delta Y = -\frac{\varepsilon Ly}{X0}\Delta Y = -\frac{CS}{Ly}\Delta Y \quad (5)$$

Any spurious movements $\Delta Z$ along the third reference axis Z are instead compensated by virtue of the axial symmetry of the sensor MEMS 1.

While the unbalance introduced by the movement $\Delta X$ is of a differential type and is itself suitable to be detected by a fully differential sensing operational amplifier (see, for example, the article "A Three-Axis Micromachined Accelerometer with a CMOS Position-Sense Interface and Digital Offset-Trim Electronics" by M. Lemkin, B. Boser, IEEE Journal of Solid-State Circuits, Vol. 34, N. 4, Pages 456–468), the movement ΔY introduces a notable common mode variation of the common sensing capacitance Cs, as it causes a variation of the facing area A (FIG. 2).

Since the sensing operational amplifier allows detection of a voltage that is directly proportional to the capacitive unbalance ΔCs, which in turn is directly proportional to the common sensing capacitance Cs, the common mode variation due to the movement ΔY introduces a significant sensing error.

BRIEF SUMMARY OF THE INVENTION

An embodiment of the present invention overcomes the above-mentioned drawbacks.

According to an embodiment of the present invention, a method and a circuit are provided for detection of displacements through a micro-electromechanical sensor. The sensor includes a fixed body and a mobile mass, and forms a first sensing capacitor and a second sensing capacitor having a common capacitance at rest. The first and second sensing capacitors are connected to a first input terminal and, respectively, to a first output terminal and to a second output terminal of the sensing circuit.

According to an embodiment of the invention, the method includes the steps of closing a first negative-feedback loop, which is formed by the first and second sensing capacitors and by a differential amplifier, feeding an input of the differential amplifier with a staircase sensing voltage through driving capacitors so as to produce variations of an electrical driving quantity which are inversely proportional to the common sensing capacitance, and driving the sensor with the electrical driving quantity.

According to another embodiment of the invention, a circuit for detecting displacements in the sensor is provided, including a first negative-feedback loop, which can be closed selectively and which includes the first and second sensing capacitors and first amplifier means. The circuit also includes voltage-source means connected to the first amplifier means via capacitive driving means and supplying a staircase sensing voltage when the first negative-feedback loop is closed, so as to produce variations of an electrical driving quantity of the sensor, which are inversely proportional to the common sensing capacitance.

BRIEF DESCRIPTION OF THE SEVERAL VIEWS OF THE DRAWING(S)

For a better understanding of the present invention, two embodiments thereof are now described, purely by way of non-limiting example, with reference to the attached drawings, wherein.

DETAILED DESCRIPTION OF THE INVENTION

To overcome the drawbacks described above, a method and a circuit for reading a MEMS sensor have been proposed in U.S. patent application Ser. No. 10/081,134, filed on Feb. 20, 2002 in the name of the same Applicants, which is incorporated by reference in its entirety.

Figure 3:
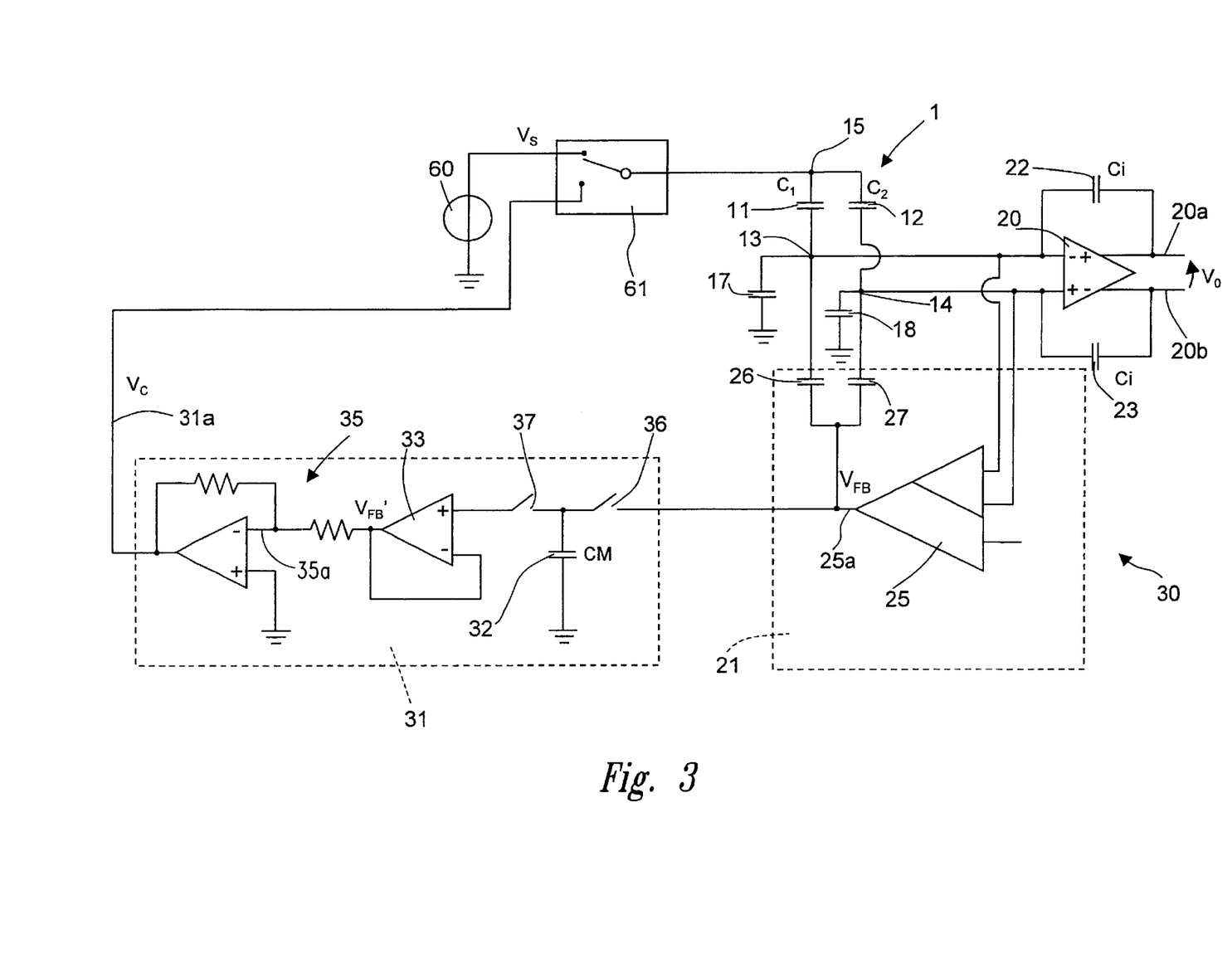
FIG. 3 is a simplified circuit diagram of a sensing circuit for a micro-electromechanical sensor object of a previous patent application.

This patent application will be briefly described with reference to FIG. 3, where the MEMS sensor 1 is schematized through a first and a second equivalent sensing capacitor 11, 12, having capacitances equal to the first and, respectively, to the second sensing capacitance C1, C2, and further having first terminals connected to a first and, respectively, a second sensing node 13, 14 and second terminals connected to a common node 15. In FIG. 3, the parasitic capacitances of the sensor MEMS 1 are schematized by parasitic capacitors 17, 18 connected between the sensing nodes 13, respectively 14, and ground.

A sensing circuit 30 comprises a sensing operational amplifier 20, a feedback stage 21, a compensation stage 31 and a signal generator 60, which is connectable to the common node 15 through a first input of a selector 61 and supplies a sensing voltage Vs.

Briefly, the sensing operational amplifier 20, having fully differential topology, has its inputs connected to the first and, respectively, to the second sensing node 13, 14, is connected in a charge-integrator configuration, and supplies an output voltage Vo.

The feedback stage 21 comprises an amplifying circuit 25 and a first and a second feedback capacitor 26, 27, having first terminals connected to an output 25a of the amplifying circuit 25 and second terminals connected to the first and to the second sensing node 13, 14, respectively. The amplifying circuit 25, has differential inputs connected to the first and to the second sensing node 13, 14, respectively, and receives a reference voltage $V_{REF}$ on a reference input 25b and supplies a feedback voltage $V_{FB}$ on its output 25a.

The compensation stage 31 has an input, connected to the output 25a of the amplifying circuit 25, and an output 31a, connectable to the common node 15 through a second input of the selector 61. Moreover the compensation stage 31 supplies a compensation voltage Vc, linked to the common sensing capacitance Cs of the sensor MEMS 1 approximately by an inverse proportional function, as explained in detail below.

The compensation stage 31 comprises a memory capacitor 32, a decoupling stage 33, preferably an operational amplifier in follower configuration, and an inverting amplifier 35.

The memory capacitor 32 has a first terminal connected to ground and a second terminal alternatively connectable to the output 25a of the amplifying circuit 25 and to the decoupling stage 33 through respective first and second switches 36, 37, controlled in counterphase.

The inverting amplifier 35 has an input terminal 35a connected to the output of the decoupling stage 33; and an output terminal forming the output 31a of the compensation stage 31 and supplying the compensation voltage Vc.

The sensing circuit 30 exploits the fact that the common sensing capacitance Cs is, to a first approximation, linked to the compensation voltage Vc through an inverse proportionality relation.

Figures 4, 7:
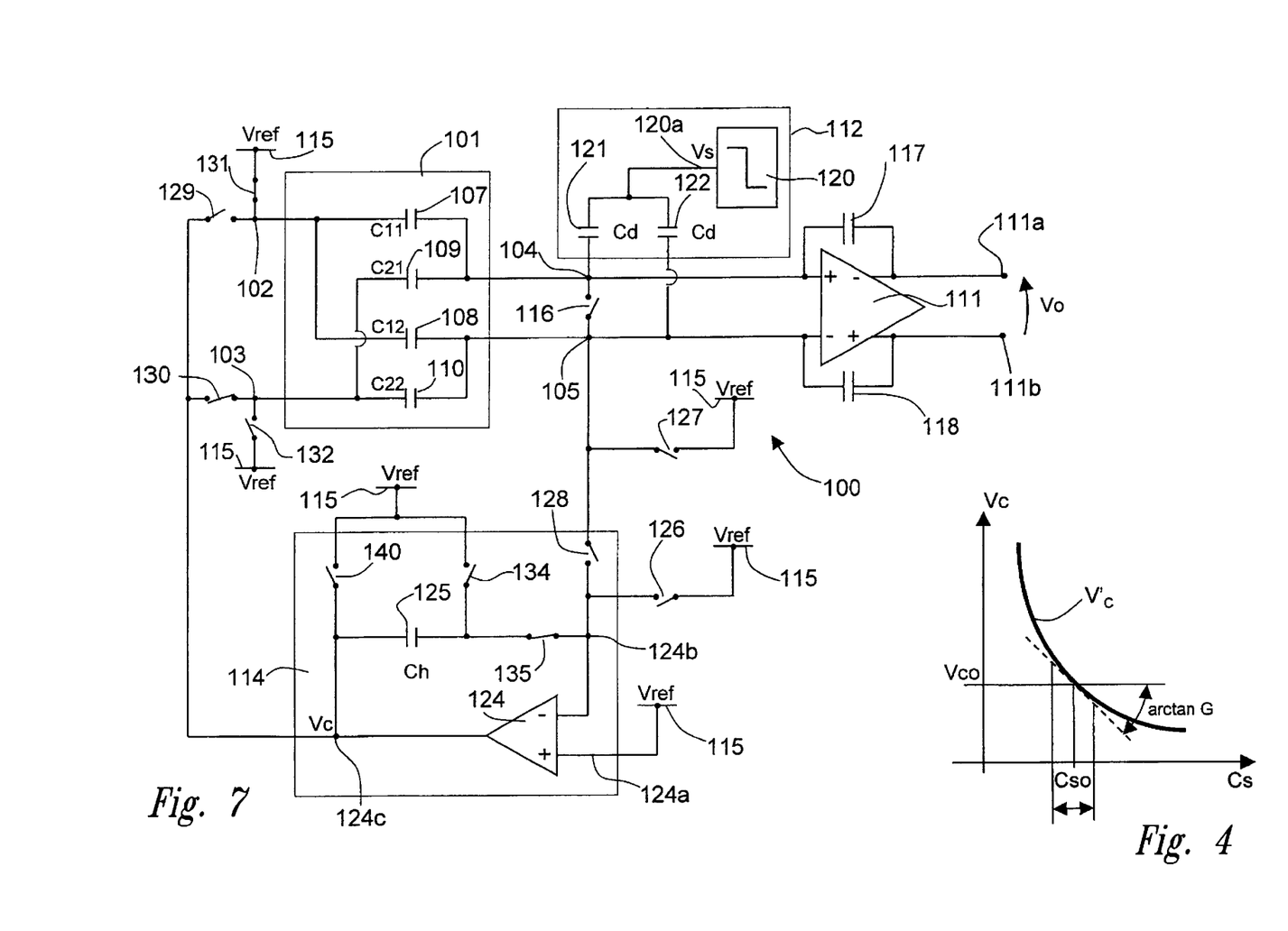
FIG. 4 is a graph of quantities present in the circuit of FIG. 3.
FIGS. 5–7 show circuit diagrams of a sensing circuit for a micro-electromechanical sensor according to a first embodiment of the present invention, in different operating configurations.

In fact, when the sensing voltage Vs (which has a constant value) is supplied to the mobile mass 4, the feedback voltage $V_{FB}$ supplied by the amplifier circuit 25 assumes a value directly proportional to the overall sensing capacitance Cs, as also does the output voltage Vo. In two subsequent steps, the feedback voltage $V_{FB}$ is stored and then transferred to the compensation operational amplifier 35. Given that the gain G of the inverting amplifier 35 is negative and the variations in the common sensing capacitance Cs that are due to spurious displacements $\Delta Y$ are of the order of femtoFarads, the pattern of the compensation voltage Vc with respect to the variations in the common sensing capacitance Cs is a first-order approximation of a relation of inverse proportionality (see FIG. 4, which also shows a curve Vc(inversely proportional to the common sensing capacitance Cs). In other words, in a preset neighborhood I of a rest value Cs0 of the common sensing capacitance Cs, it is correct to assume that $$Vc = K/Cs \quad (6)$$

where K is a constant of proportionality.

The compensation voltage thus obtained is supplied to the common node 15. In this step, the output voltage Vo is given by the following relation:

$$Vo = 2\frac{K2}{Ci}\frac{\Delta Cs}{Cs} \quad (7)$$

Since, according to equations (4) and (5), the capacitive unbalancing $\Delta Cs$ is given by $$\Delta Cs = \Delta Csx + \Delta Csy = Cs\left(\frac{\Delta X}{X0} - \frac{\Delta Y}{Ly}\right) \cong Cs\frac{\Delta X}{X0} \quad (8)$$

the output voltage Vo is found to be substantially independent of the common sensing capacitance Cs. In fact, combining equations (7) and (8) we obtain $$Vo = 2\frac{K2}{Ci}\frac{\Delta X}{X0} \quad (9)$$

The sensing circuit 30 has, however, some limitations, which are mainly due to the fact that a first-order approximation is made. Following upon this approximation, in fact, linearity errors may occur, especially when the spurious displacements of the mobile mass 4 are of a considerable amount. In this case, the compensation of the spurious displacements may be imprecise, and, moreover, distortions are introduced that degrade the performance of the sensing circuit.

Secondly, it is necessary to introduce a special compensation stage, which involves a considerable increase in the overall dimensions of the circuit.

An further improvement is therefore described below, which overcomes the limitations outlined above.

Figure 5:
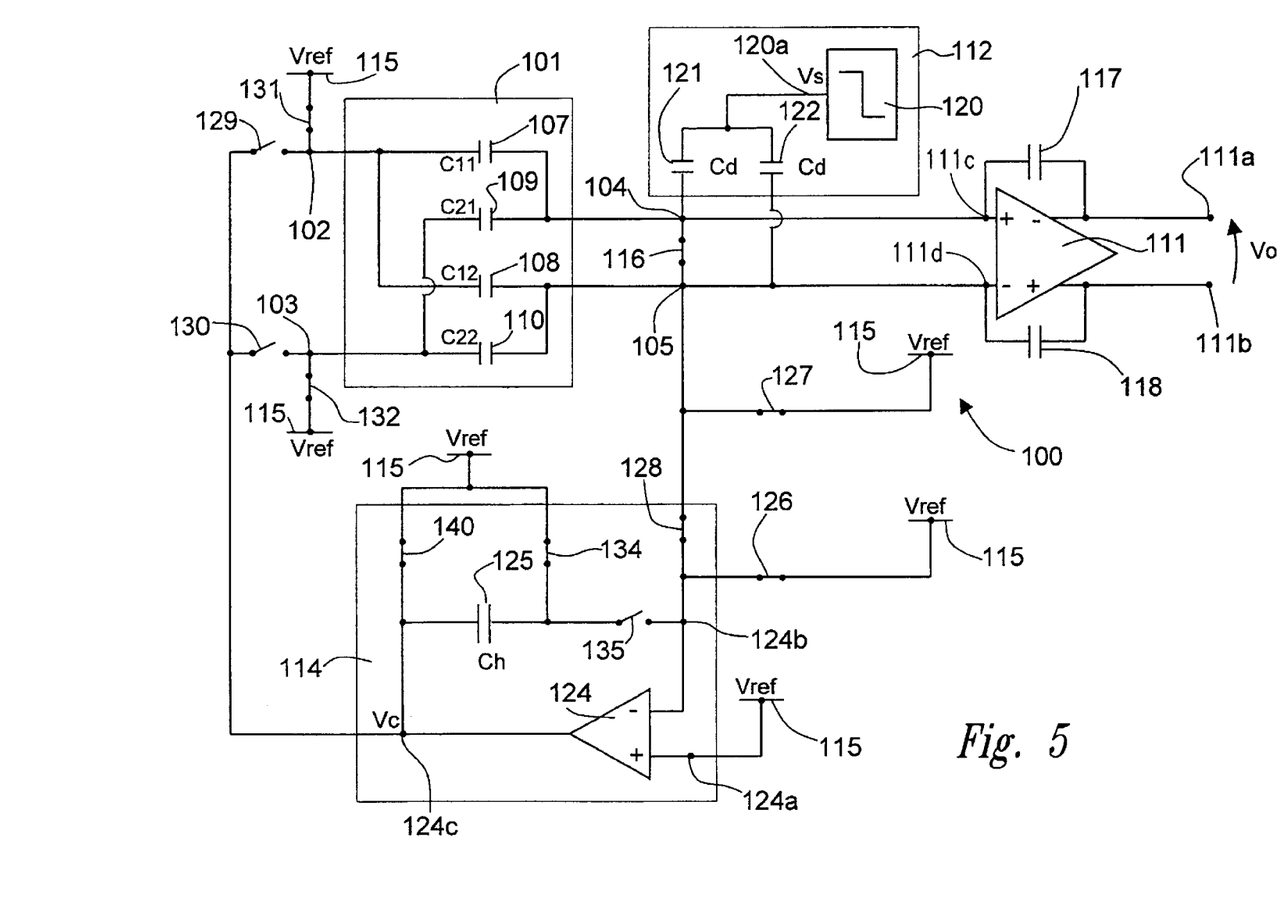
Figure 6:
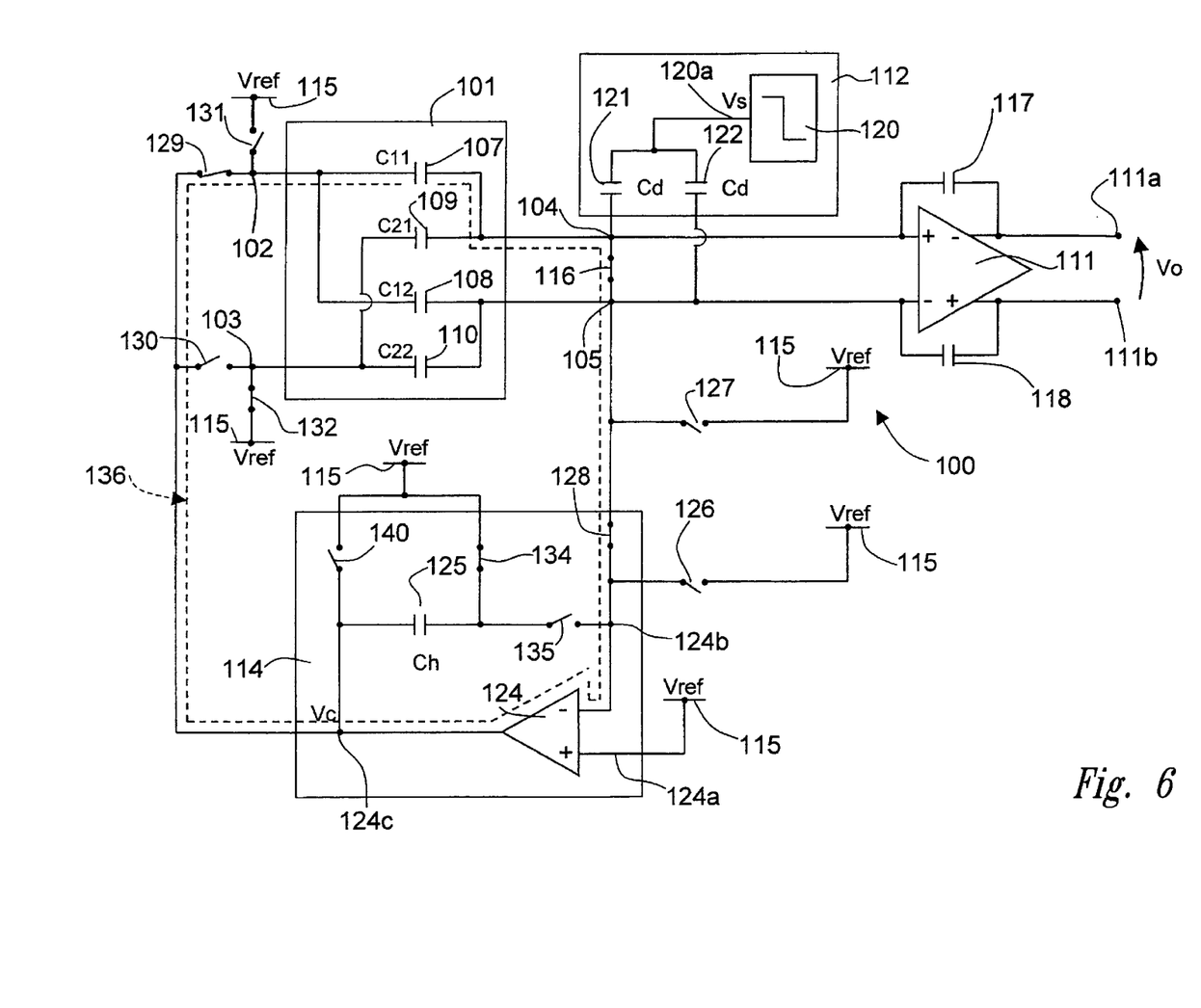

With reference to FIGS. 5–7, number 100 designates a sensing circuit for a MEMS sensor 101, here of the differential input type. The MEMS sensor 101, per se known and having a stator 2 and a mobile mass 3 as shown in FIGS. 1 and 2, has a first input terminal 102 and a second input terminal 103, which are connected to the mobile mass 3, and a first output terminal 104 and a second output terminal 105, which are connected to the stator 2 and can be represented schematically by four equivalent sensing capacitors 107–110. In detail, a first equivalent sensing capacitor 107, having capacitance C11, is connected between the first input terminal 102 and the first output terminal 104; a second equivalent sensing capacitor 108, having capacitance C12, is connected between the first input terminal 102 and the second output terminal 105; a third equivalent sensing capacitor 109, having capacitance C21, is connected between the second input terminal 103 and the first output terminal 104; and a fourth equivalent sensing capacitor 110, having capacitance C22, is connected between the second input terminal 103 and the second output terminal 105.

In addition, at rest, the capacitances of the sensors are all equal to a common sensing capacitance Cs. When, instead, the MEMS sensor 101 is excited, a capacitive unbalancing $\Delta Cs$ is generated, defined by equations (4) and (5), and the capacitances of the equivalent sensing capacitors 107–110 are given by the relations $$C11 = C22 = Cs + \Delta Cs \quad (10)$$

$$C12 = C21 = Cs - \Delta Cs \quad (11)$$

The sensing circuit 100 comprises a sensing operational amplifier 111, having fully differential topology, a driving stage 112, a feedback stage 114, and at least one reference line 115, which supplies a reference voltage Vref.

The sensing operational amplifier 111 has a non-inverting input 111c and an inverting input 111d, which are respectively connected to the first output terminal 104 and to the second output terminal 105 of the MEMS sensor 101, and an inverting output 111a and a non-inverting output 111b, between which an output voltage Vo is supplied. In addition, a first feedback switch 116 is connected between the inputs of the operational amplifier 111. A first integration capacitor 117 is connected between the non-inverting input 111c and the inverting output 111a, and a second integration capacitor 118 is connected between the inverting input 111d and the non-inverting output 111b of the sensing operational amplifier 111, which is consequently in a charge-integrator configuration. Both of the integration capacitors 117, 118 have integration capacitance Ci.

The driving stage 112 comprises a signal-generator circuit 120, which has an output 120a supplying a staircase sensing voltage Vs with steps of predetermined amplitude and duration, and a pair of driving capacitors 121, 122, which have driving capacitance Cd and present first terminals in common, connected to the output 120a of the signal-generator circuit 120, and second terminals, connected, respectively, to the non-inverting input and to the inverting input of the sensing operational amplifier 111.

The feedback stage 114 comprises a feedback operational amplifier 124 and a holding capacitor 125 having holding capacitance Ch.

The feedback operational amplifier 124 has a non-inverting input 124a connected to the reference line 115; an inverting input 124b connected to the second output terminal 105 of the MEMS sensor 101 via a second feedback switch 128 and to the reference line 115 via a first supply switch 126; and an output 124c which supplies a compensation voltage Vc. A second initialization switch 127 is connected between the reference line 115 and the second output terminal 105 of the MEMS sensor 101. In addition, the output 124c of the feedback operational amplifier 124 is connected to the reference line 115 via a third initialization switch 140, and is also connected to the first input terminal 102 and to the second input terminal 103 of the MEMS sensor 101 via a first driving switch 129 and via a second driving switch 130, respectively. The first input terminal 102 and the second input terminal 103 of the MEMS sensor 101 are in turn connected to the reference line 115 via a third driving switch 131 and a fourth driving switch 132, respectively.

The holding capacitor 125 has a first terminal connected to the output 124c of the feedback operational amplifier 124 and a second terminal which can be selectively connected to the reference line 115, via a first holding switch 134, and to the inverting input 124b of the feedback operational amplifier 124, via a second holding switch 135.

Operation of the sensing circuit 100 is described hereinafter. First, an initialization step is performed, during which the initialization switches 126, 127, 140, the feedback switches 116, 128, the third and fourth driving switches 131, 132, and the first holding switch 134 are closed, while the first and second driving switches 129, 130 and the second holding switch 135 are open (FIG. 5). Consequently, the input terminals 102, 103 and output terminals 104, 105 of the MEMS sensor 101 and the inputs 124a, 124b of the feedback operational amplifier 124 are set at the reference voltage Vref. Also the compensation voltage Vc at the output 124c of the feedback operational amplifier 124 is initially equal to the reference voltage Vref.

Next, the common sensing capacitance Cs is detected and stored. In detail (FIG. 6), the initialization switches 126, 127, 140 and the third driving switch 131 are open, while the first driving switch 129 is closed. In this way, a negative-feedback loop 136 formed by the feedback operational amplifier 124 and by the first and second equivalent sensing capacitors 107, 108 is closed. In addition, the feedback operational amplifier 124 is in an inverting-amplifier configuration; in particular, the driving capacitors 121, 122 and the sensing capacitors 107, 108 respectively form input elements and feedback elements of the inverting amplifier.

Immediately after switching of the switches 126, 127, 140, 129, and 131, the signal-generator circuit 120 generates a voltage step having an amplitude Vs, said step being supplied to the input 124b of the feedback operational amplifier 124 through the driving capacitors 121, 122, and, on account of the presence of the negative-feedback loop 136, determines a variation in the compensation voltage ΔVc given by the relation $$\Delta Vc = -\frac{2Cd}{2Cs}Vs = -\frac{Cd}{Cs}Vs \qquad (12)$$

In this step, in fact, the first equivalent sensing capacitor 107 and the second equivalent sensing capacitor 108 are parallel connected, and likewise the first driving capacitor 121 and the second driving capacitor 122 are parallel connected (the first feedback switch 116 is still closed). Consequently, the capacitance altogether present between the output 120a of the signal-generator circuit 120 and the inverting input 124b of the feedback operational amplifier 124 is equal to 2Cd, while the capacitance between the inverting input 124b and the output 124c of the feedback operational amplifier 124, according to equations (10) and (11), is given by the relation $$C11 + C12 = Cs + \Delta Cs + Cs - \Delta Cs = 2Cs \qquad (13)$$

The compensation voltage Vc (initially equal to Vref) goes to, and is held, at a driving voltage Vcd given by the equation $$Vcd = Vref + \Delta Vc \qquad (14)$$

In practice, the variation in the compensation voltage ΔVc, which is inversely proportional to the common sensing capacitance Cs, as shown by relation (12), is stored by the holding capacitor 125. In addition, this value of the driving voltage Vcd is also fed on the first input terminal 102 of the MEMS sensor 101, which is directly connected to the output 124c of the feedback operational amplifier 124.

Next, the capacitive unbalancing ΔCs is detected. In particular, the step of the sensing-voltage Vs terminates, and the feedback switches 116, 128, the first holding switch 129, and the first and fourth driving switches 129, 132 are opened, while the second holding switch 135, and the second driving switch 130 and the fourth driving switch 131 are closed (FIG. 7). Given that the second feedback switch 128 is open, the negative-feedback loop 136 is open. In addition, switching of the holding switches 134, 135 enables feedback connection of the holding capacitor 125 between the inverting input 124b and the output 124c of the feedback operational amplifier 124. In this way, the charge on the holding capacitor 125 is conserved, and hence the compensation voltage Vc on the output 124c of the feedback operational amplifier 124 is kept at the driving voltage Vcd.

In addition, the compensation voltage Vc is used for driving the MEMS sensor 101. In detail, the output 124c of the feedback operational amplifier 124 is disconnected from the first input terminal 102 and connected to the second input terminal 103 of the MEMS sensor 101. Consequently, the voltage on the first input terminal 102 of the MEMS sensor 101 switches from the driving value Vcd to the value of the reference voltage Vref. Instead, the voltage on the second input terminal 103 switches from the value of the reference voltage Vref to the driving value Vcd. In other words, voltage steps of opposite sign and of an amplitude equal to the variation in the compensation voltage ΔVC, and hence inversely proportional to the common sensing capacitance Cs, are applied simultaneously to the input terminals 102, 103 of the MEMS sensor 101.

Thanks to the above relation of inverse proportionality, the output voltage Vo in this step is given by the following relation, which is analogous to equation (7):

$$Vo = 2\Delta Vc \frac{2\Delta Cs}{Ci} = \frac{A}{Cs}\frac{\Delta Cs}{Ci} \qquad (15)$$

where A is a constant.

As already discussed previously, in particular with reference to equations (8) and (9), the output voltage Vo is independent of the common sensing capacitance Cs, given that the capacitive unbalancing ΔCs is directly proportional to the common sensing capacitance, and hence the errors due to spurious displacements of the mobile mass of the MEMS sensor 101 are substantially eliminated.

In addition, the use of staircase voltages with steps of equal amplitude and opposite sign for driving the MEMS sensor 101 makes it possible to maintain constant the common-mode voltages at the output terminals 104, 105 of the MEMS sensor 101, thus the parasitic capacitances (not illustrated) associated to these output terminals have no effect.

Figure 8:
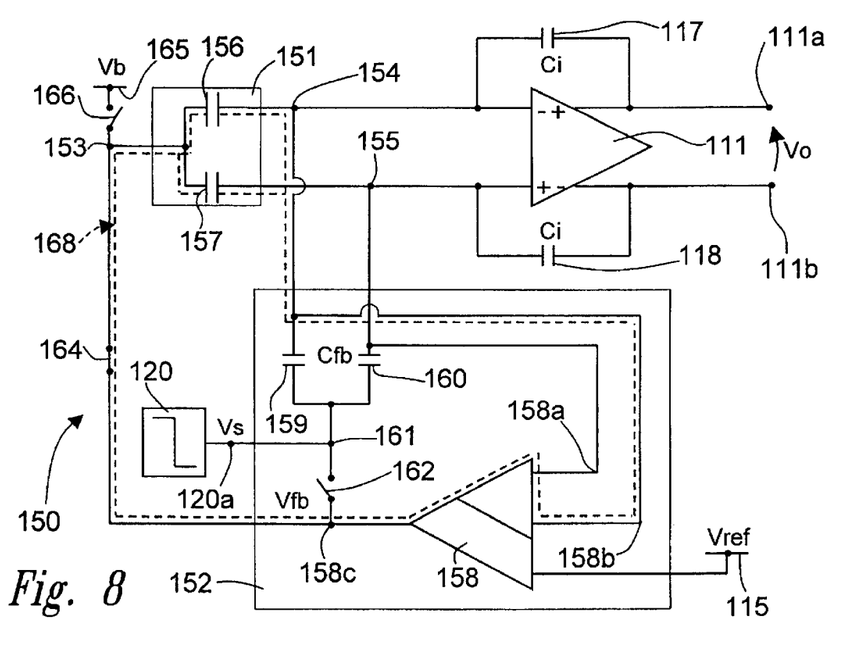
FIGS. 8 and 9 show circuit diagrams of a sensing circuit for a micro-electromechanical sensor according to a second embodiment of the present invention, in different operating configurations.
Figure 9:
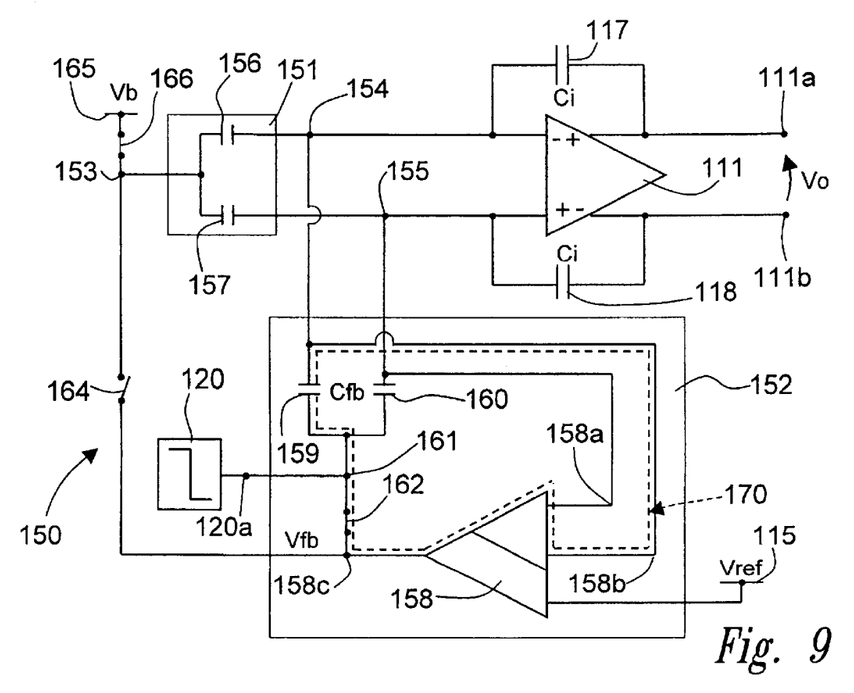

FIGS. 8 and 9, in which parts in common with those already shown are designated by the same reference numbers, illustrate a different embodiment of the invention, according to which a sensing circuit 150 for a MEMS sensor 151 comprises the sensing operational amplifier 111, in a charge-integrator configuration, the reference line 115, the signal-generator circuit 120, a biasing line 165, which supplies a biasing voltage Vb, and a feedback stage 152.

Figure 1:
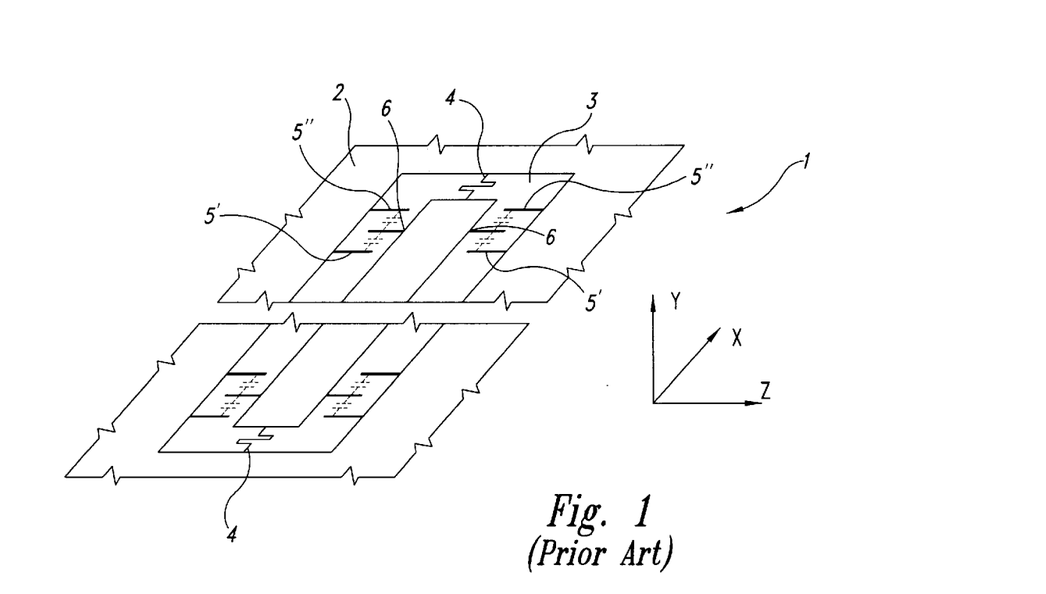
FIG. 1 is a perspective view of a micro-electromechanical sensor of a known type.

The MEMS sensor 151, in the present case of the single-input type described in FIGS. 1 and 2, has an input terminal 153 and a first output terminal 154 and a second output terminal 155, and may be schematically represented by a first equivalent sensing capacitor 156 and a second equivalent sensing capacitor 157. In particular, the first equivalent sensing capacitor 156 is connected between the input terminal 153 and the first output terminal 154 and has a capacitance equal to the common sensing capacitance Cs when the MEMS sensor 151 is at rest, and a capacitance equal to Cs+ΔCs when the MEMS sensor 151 is excited and a capacitive unbalancing ΔCs occurs. The second equivalent sensing capacitor 157 is connected between the input terminal 153 and the second output terminal 155 and has a capacitance equal to the common sensing capacitance Cs when the MEMS sensor 151 is at rest, and a capacitance equal to Cs−ΔCs when the MEMS sensor 151 is excited.

The feedback stage 152 comprises an amplifier circuit and a first feedback capacitor 159 and a second feedback capacitor 160.

The amplifier circuit 158, per se known and described in detail in the aforementioned article, has a pair of differential inputs 158a, 158b, respectively connected to the first output terminal 154 and to the second output terminal 155 of the MEMS sensor 151, a reference input connected to the reference line 115, and an output 158c, which supplies a feedback voltage Vfb and is connected to a feedback node 161 via a feedback switch 162 and to the input terminal 153 of the MEMS sensor 151 via a driving switch 164. The input terminal 153 of the MEMS sensor 151 is moreover connected to the driving line 165 via a biasing switch 166.

The first feedback capacitor 159 and the second feedback capacitor 160, both having feedback capacitance Cfb, have first terminals connected to the feedback node 161 and second terminals respectively connected to the first output terminal 154 and to the second output terminal 155 of the MEMS sensor 151.

The signal-generator circuit 120, which supplies a voltage step having amplitude Vs, has an output 120a, which is connected to the feedback node 161.

In an initial operating step, the sensing circuit 150 is initialized by closing the biasing switch 166 and the driving switch 164 and opening the feedback switch 162. In this way, the input terminal 153 of the MEMS sensor 151 and the output 158c of the amplifier circuit 158 go to the biasing voltage Vb (namely, Vfb=Vb).

Next (FIG. 8), the biasing switch 166 is opened, and the signal-generator circuit 120 supplies a voltage step having amplitude Vs. In this phase, the driving switch 164 closes a first negative-feedback loop 168, which is formed by the amplifier circuit 158 and by the equivalent sensing capacitors 156, 157 of the MEMS sensor 151. Consequently, the voltage step of amplitude Vs brings about a variation ΔVfb in the feedback voltage Vfb generated by the amplifier circuit 158, the operation of which is described in detail in the aforementioned article. In practice, the amplitude of the variation ΔVfb of the feedback voltage Vfb is given by the expression $$\Delta Vfb = Vs(Cfb/Cs) \quad (16)$$

and is thus inversely proportional to the common sensing capacitance Cs.

The value of the feedback voltage Vfb on the output 158c of the amplifier circuit 158 and on the input terminal 153 of the MEMS sensor 151 is therefore $$Vfb = Vb + \Delta Vfb \quad (17)$$

Next, all the switches 162, 164, 166 switch (FIG. 9). In this way, the first negative-feedback loop 168 is opened, and a second negative-feedback loop 170 formed by the amplifier circuit 158 and by the feedback capacitors 159, 160 is closed. Thanks to the second negative-feedback loop 170, the amplifier circuit 158, in a per se known manner, maintains at a constant value the common-mode voltage between the first output terminal and the second output terminal of the MEMS sensor 151, and hence between the inputs of the sensing operational amplifier 111, which thus operates correctly.

In addition, in this step the input terminal 153 of the MEMS sensor 151, which is again connected to the biasing line 165, goes to the biasing voltage Vb. In practice, then, the voltage at the input terminal 153 undergoes an amplitude variation equal to the variation ΔVfb of the feedback voltage Vfb, and hence a variation that is inversely proportional to the common sensing capacitance Cs.

Consequently, the output voltage Vo is given by the equation $$Vo = 2\Delta Vfb\frac{\Delta Cs}{Ci} = \frac{B}{Cs}\frac{\Delta Cs}{Ci} \quad (18)$$

where B is a constant.

Also in this case, the contributions due to spurious displacements are thus cancelled out by applying to the input terminal of the MEMS sensor 151 a voltage inversely proportional to the common sensing capacitance Cs.

The advantages of the present invention emerge clearly from the foregoing description.

First, the sensing circuit described herein has not any problems of linearity, since no approximations are made, but rather the properties of the feedback amplifiers are exploited for generating a voltage which is in itself inversely proportional to the common sensing capacitance Cs. Consequently, the spurious displacements of the mobile mass of the MEMS sensor are effectively eliminated without introducing any distortions, and hence the precision of the sensing circuit is markedly improved.

Second, it is not necessary to provide additional compensation stages, and consequently the sensing circuit is simpler to build and has small overall dimensions.

Finally, it is clear that modifications and variations may be made to the circuit and method described herein, without thereby departing from the scope of the present invention.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

What is claimed is:

1. A method for detecting displacements using a microelectromechanical sensor which comprises a fixed body and a mobile mass that form a first sensing capacitor and a second sensing capacitor and have a common sensing capacitance at rest;

the method comprising:
    closing a first negative-feedback loop comprising said first and second sensing capacitors and an amplifier;
    supplying said amplifier with a staircase sensing voltage via capacitive driving means so as to produce variations of an electrical driving quantity which are inversely proportional to said common sensing capacitance; and
    driving said sensor with said electrical driving quantity.

2. The method according to claim 1, wherein said step of closing comprises connecting together an output and at least one input of said amplifier via said first and second sensing capacitors.

3. The method according to claim 2, wherein said step of driving said sensor comprises opening said first negative feedback loop.

4. The method according to claim 3, wherein said sensing capacitor is connected between a first input terminal and a first output terminal, said second sensing capacitor is connected between said first input terminal and a second output terminal, a third sensing capacitor is connected between a second input terminal and said first output terminal, and a fourth sensing capacitor is connected between said second input terminal and said second output terminal, and wherein said step of driving said sensor comprises supplying, to said first input terminal and to said second input terminal of said sensor, respective staircase voltages with steps of equal amplitude correlated to said variations of said electrical driving quantity and of opposite sign.

5. The method according to claim 4, wherein:
during said step of closing said first feedback loop, said first input terminal is connected to said output of said amplifier, and said second input terminal is connected to a reference line supplying a reference voltage; and
during said step of driving said sensor, said first input terminal is connected to said reference line, and said second input terminal is connected to said output of said amplifier.

6. The method according to claim 5, further comprising the step of storing said electrical driving quantity.

7. The method according to claim 6, wherein said step of storing comprises connecting a holding capacitor between said output and said reference line during said step of supplying said staircase sensing voltage, and connecting said holding capacitor between said output and said input of said amplifier during said step of supplying, to said first input terminal and to said second input terminal of said sensor, respective staircase voltages.

8. The method according to claim 3, wherein said step of driving said sensor comprises supplying said sensor with a staircase voltage with steps having an amplitude correlated to said variations of said electrical driving quantity.

9. The method according to claim 8, comprising the step of closing a second negative-feedback loop which includes said amplifier and said capacitive driving means.

10. The method according to claim 8, wherein said first sensing capacitor and said second sensing capacitor are connected together to an input terminal, and further comprising:
connecting, before said step of closing said first negative-feedback loop, said input terminal to a biasing line that supplies a biasing voltage;
connecting said input terminal to said output of said amplifier means during said step of closing said first negative-feedback loop; and
connecting said input terminal to said biasing line during said step of driving said sensor.

11. The method according to claim 1 wherein said staircase sensing voltage has steps of preset amplitude and duration.

12. The method according to claim 11, further comprising removing said staircase sensing voltage before carrying out said step of driving said sensor.

13. A circuit for detecting displacements using a microelectromechanical sensor which comprises a fixed body and a mobile mass that form a first sensing capacitor and a second sensing capacitor, which are connected to a first input terminal and, respectively, to a first output terminal and to a second output terminal and have, at rest, a common sensing capacitance and have, during displacement, a capacitive unbalancing;
the circuit comprising:
a first negative-feedback loop, which can be closed selectively and comprises said first and second sensing capacitors and first amplifier means; and
voltage-source means connected to said first amplifier means via capacitive driving means and supplying a staircase sensing voltage when said first negative-feedback loop is closed, so as to produce variations of an electrical driving quantity of said sensor, which are inversely proportional to said common sensing capacitance.

14. The circuit according to claim 13, further comprising activation means for selectively closing and opening said first negative-feedback loop.

15. The circuit according to claim 13, wherein, when said first negative-feedback loop is closed, said first input terminal is connected to an output of said amplifier means and said first and second output terminals are connected to at least one input of said first amplifier means.

16. The circuit according to claim 13, further comprising second amplifier means having inputs respectively connected to said first output terminal and to said second output terminal, and outputs supplying an output voltage correlated to said capacitive unbalancing.

17. The circuit according to claim 13, further comprising memory means storing said electrical driving quantity.

18. The circuit according to claim 13, further comprising a second negative-feedback loop which can be closed selectively and includes said first amplifier means and said capacitive driving means.

19. A device, comprising:
a microelectromechanical sensor including first and second sensing capacitors having respective first terminals coupled to a sensing input and respective second terminals coupled to first and second sensing outputs, respectively, the sensor being configured such that the sensing capacitors have a common capacitance when the sensor is at rest and an unbalanced capacitance when the sensor is displaced;
a staircase voltage generator;
first and second driving capacitors; and
a compensation amplifier having first and second compensation inputs and a compensation output selectively connected, in a first feedback configuration, with the compensation output coupled to the sensing input and the first and second compensation inputs coupled to the first and second sensing outputs, and, in a second feedback configuration, with the first and second compensation inputs coupled, via the first and second driving capacitors, respectively, to the staircase voltage generator.

20. The device of claim 19, further comprising a biasing voltage source configured to be coupled to the sensing input when the compensation amplifier is connected in the second feedback configuration.

21. The device of claim 19, further comprising a sensing amplifier having first and second inputs coupled to the first and second sensing outputs, respectively, and configured to output a voltage directly related to a difference between capacitances of the first and second.

22. The device of claim 19 wherein the compensation amplifier is configured to supply a compensation voltage inversely proportionate to variations in the common capacitance.

* * * * *

UNITED STATES PATENT AND TRADEMARK OFFICE
CERTIFICATE OF CORRECTION

PATENT NO. : 6,753,691 B2
DATED : June 22, 2004
INVENTOR(S) : Ernesto Lasalandra et al.

It is certified that error appears in the above-identified patent and that said Letters Patent is hereby corrected as shown below:

Title page,
Item [56], References Cited, U.S. PATENT DOCUMENTS,
-- 3,986,109   10/12/76   Poduje   324/61 R
4,054,833   10/18/77   Briefer   324/60 C
4,208,625   06/17/80   Piso   324/61 R
4,287,471   09/01/81   Ko et al.   324/61 R
4,860,232   08/22/89   Lee et al.   324/571.04
2002/0175692   11/28/02   Lasalandra et al. 324/684 --

FOREIGN PATENT DOCUMENTS
FR   2 706 038   12/09/94

OTHER PUBLICATIONS
Lemkin, M. et al., "A Three-Axis Micromachined Accelerometer with a CMOS Position-Sense Interface and Digital Offset-Trim Electronics," *IEEE Journal of Solid-State Circuits,* 34(4):456-468, April 1999. --

Signed and Sealed this

Twenty-eighth Day of September, 2004

JON W. DUDAS
*Director of the United States Patent and Trademark Office*